E. A. AND C. R. PAGE.
AUTOMOBILE CONTROL DEVICE.
APPLICATION FILED SEPT. 22, 1919.
1,342,060.    Patented June 1, 1920.
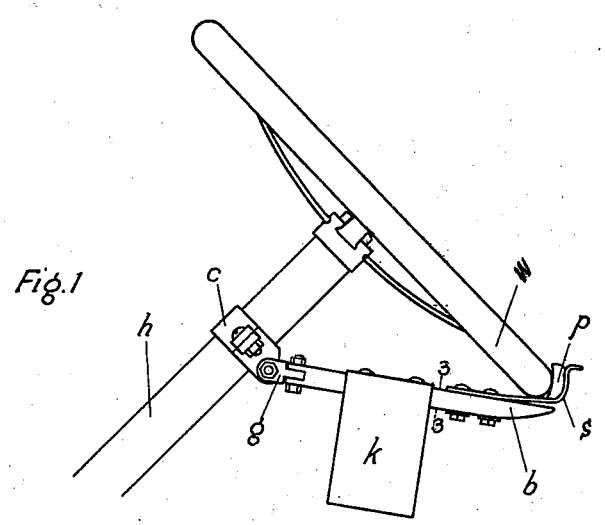
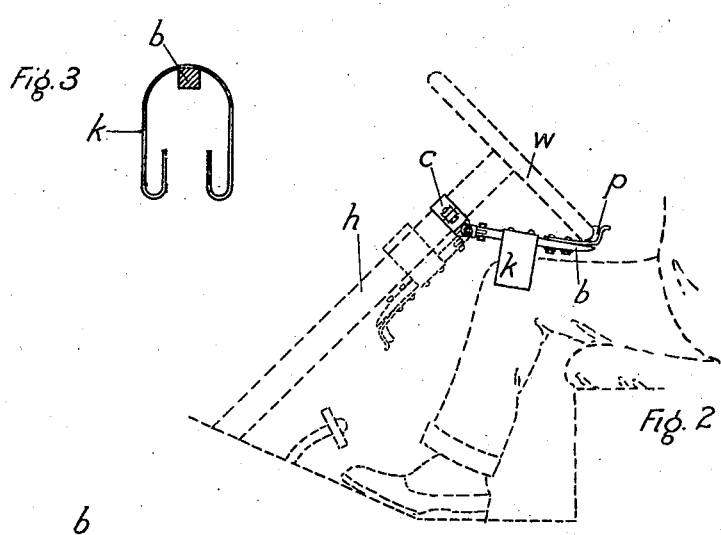
Clarence R. Page
Edwin A. Page
INVENTORS
BY W. C. Carman
ATTORNEY.

UNITED STATES PATENT OFFICE.

EDWIN A. PAGE AND CLARENCE R. PAGE, OF YOUNGSTOWN, OHIO.

AUTOMOBILE-CONTROL DEVICE.

1,342,060.　　　　Specification of Letters Patent.　　Patented June 1, 1920.

Application filed September 22, 1919. Serial No. 325,573.

*To all whom it may concern:*

Be it known that we, EDWIN A. PAGE and CLARENCE R. PAGE, citizens of the United States, residing at Youngstown, in the county of Mahoning and State of Ohio, have invented certain new and useful Improvements in Automobile-Control Devices, of which the following is a specification.

This invention relates to automobile control, the object being to provide a simple means whereby the operator may hold rigid, or manipulate, the steering wheel with his knees, when it becomes necessary or desirable to temporarily release his hands for other purposes.

In the drawings, Figure 1 is a side elevation with our device attached; Fig. 2 is a fragmentary view showing the application of the device in contact with the knee of the operator; Fig. 3 is a sectional view on the line 3—3 Fig. 1, and Fig. 4 illustrates a modification of the device.

$c$ represents a collar or clip rigidly secured to the housing $h$ of the steering post. Secured to the clip $c$, by means of the gimbal-joint element $g$, is the bar $b$, which is thereby afforded a free swinging movement both laterally and perpendicularly. To the free or outer end of bar $b$ is secured the spring grip-piece $s$, the outer end of which is turned upwardly to engage the steering wheel $w$. To the inner face of this grip element may be secured a rubber or fiber pad $p$ for the purpose of increasing the frictional contact with the steering wheel.

Secured to the central portion of the bar $b$ is the knee-plate $k$, shown in Fig. 3 in U-shape, so disposed that it may be conveniently engaged by the knee of the operator.

If desired, the bar $b$ may be bent downwardly, forming the loop $l$, as shown in Fig. 4, to serve in lieu of the knee-plate $k$.

It is obvious that by the use of the device above described, the operator will have absolutely secure control of his machine during any temporary release of the hands when desired.

When it is not desired to use the device, it may be turned downwardly as shown in dotted lines, Fig. 2, when the knee-plate $k$, in the form of a spring, will embrace the housing $h$ and hold it securely in place.

We claim—

1. In a device of the character described, a bar swingingly mounted upon the housing of the steering post, and with its free or outer end adapted to engage the steering wheel, and a dependent knee-plate secured to said bar intermediate its ends.

2. In a device of the character described, a bar swingingly mounted upon the housing of the steering post, and provided at its outer end with a spring grip element adapted to engage the steering wheel, and a dependent knee-plate secured to said bar intermediate its ends.

3. In a device of the character described, a collar rigidly secured to the housing of the steering post, in combination with a bar swingingly secured thereto, and with its free or outer end adapted to engage the steering wheel, and a dependent knee-plate secured to said bar intermediate its ends.

4. In a device of the character described, a collar rigidly secured to the housing of the steering post, in combination with a bar swingingly secured thereto, and provided at its outer end with a spring grip element adapted to engage the steering wheel, and a dependent knee-plate secured to said bar intermediate its ends.

5. In a device of the character described, a bar swingingly mounted upon the housing of the steering post, and at its free or outer end adapted to engage the steering wheel, and provided intermediate its ends with a dependent knee-engaging element.

6. In a device of the character described, a bar swingingly mounted upon the housing of the steering post, and provided at its outer end with a spring-grip element adapted to engage the steering wheel, said bar being provided intermediate its ends with a dependent knee-engaging element.

7. In a device of the character described, a collar rigidly secured to the housing of the steering post, in combination with a bar swingingly secured thereto, and with its free or outer end adapted to engage the steering wheel, said bar being provided intermediate its ends with a dependent knee-engaging element.

8. In a device of the character described, a collar rigidly secured to the housing of the steering post, in combination with a bar swingingly secured thereto, and provided at its outer end with a spring-grip element adapted to engage the steering wheel, said bar being provided intermediate its ends with a dependent knee-engaging element.

In testimony whereof we hereunto affix our signatures in the presence of two witnesses.

EDWIN A. PAGE.
CLARENCE R. PAGE.

Witnesses:
JOHN A. FITHIAN,
T. W. MILLER.